(12) United States Patent
Wood

(10) Patent No.: US 7,483,802 B2
(45) Date of Patent: Jan. 27, 2009

(54) LINEARISATION APPARATUS

(75) Inventor: John Michael Wood, Essex (GB)

(73) Assignee: BAE Systems plc., London (GB)

( * ) Notice: Subject to any disclaimer, the term of this patent is extended or adjusted under 35 U.S.C. 154(b) by 144 days.

(21) Appl. No.: 11/628,249

(22) PCT Filed: May 27, 2005

(86) PCT No.: PCT/GB2005/050076
§ 371 (c)(1),
(2), (4) Date: Dec. 1, 2006

(87) PCT Pub. No.: WO2005/125061
PCT Pub. Date: Dec. 29, 2005

(65) Prior Publication Data
US 2007/0241805 A1   Oct. 18, 2007

(30) Foreign Application Priority Data
Jun. 18, 2004 (GB) ............... 04136763.5
Jun. 18, 2004 (GB) ............... 04253674.8

(51) Int. Cl.
*G06F 19/00* (2006.01)
(52) U.S. Cl. .................. 702/86; 356/237.1
(58) Field of Classification Search .......... 702/86, 702/182–185; 356/237.1
See application file for complete search history.

(56) References Cited

U.S. PATENT DOCUMENTS 5,039,221 A * 8/1991 Layton et al. ............... 356/478

6,028,424 A   2/2000 Twichell et al.
6,377,552 B1  4/2002 Moran, III et al.

FOREIGN PATENT DOCUMENTS

EP   0595 140 A1   10/1993

OTHER PUBLICATIONS

"Digitally Linearized Wide-Band Photonic Link" T.R. Clark et al, Journal of Lightwave Technoloyg, vol. 19, No. 2, Feb. 2001.

(Continued)

*Primary Examiner*—Edward Raymond
(74) *Attorney, Agent, or Firm*—Crowell & Moring LLP

(57) ABSTRACT

A method of linearising a non-linear opto-electronic apparatus that includes an opto-electronic Mach-Zehnder modulator that receives an incoming electrical signal for modulating a light signal passing through the modulator, where the transfer characteristic of the modulator is sinusoidal, and including means for detecting the modulating light signal and for digitizing the detected signal, wherein the method comprises the following steps:
  injecting one or more calibration tones as an input electrical signal and obtaining a digitized form of the output signal obtaining the spectrum of said digitized form and measuring the spectral values at the frequencies of the input tone or tones and at the frequencies of spectral lines arising from the non-linearity;
  providing, from said spectral values, an inverse form of the non-linearity; and
  performing linearization on subsequent output signals for arbitrary input signals by applying said inverse form of the non-linearity to the output signal.

19 Claims, 5 Drawing Sheets

OTHER PUBLICATIONS

"A/D Converters Nonlinearity Measuremeent and Correction by Frequency Analysis and Dither", Francesco Adamo et al, IEEE Transactions on Instrumentation and Measurement, vol. 52, No. 4, Aug. 2003.

"Wide-Band Analog-Digital Photonic Link with Third-Order Linearization", T.R. Clark et al, Naval Research Laboratory, Optical Sciences Division—Code 5650, Washington, DC 20375, pp. 691-694 (2000 IEEEE MIT-S Digest).

XP-002303404, pp. 624-625/CLEO 2000/ Friday Morning.

* cited by examiner

LINEARISATION APPARATUS

The present invention relates to a method and means of linearising an opto-electronic or electronic apparatus, and in particular, though not exclusively, a method and means for linearising an opto-electronic apparatus that includes an opto-electronic modulator.

A known optical link, as shown in FIG. 1, comprises a continuous wave (CW) or pulsed laser 2 coupled to a Mach-Zehnder opto-electronic modulator 4. The modulator 4 is of known construction, having two separate light paths 6. An incoming RF signal is applied at 8 to the paths 6 for modulating the relative phase of the light passing through the separate paths. Upon recombination at the modulator output, constructive or destructive interference occurs, resulting in a modulation of the amplitude of the output laser light. The modulated light is transmitted through an optical fibre 10 to a remote photo detector 12. The output of the photo detector is digitised in an Analogue to Digital Converter (ADC) 14 for subsequent processing. The link may additionally include other components such as filters or amplifiers.

One problem that arises with such optical links is that of non-linearities in the link. A principal cause of non-linearity is the transfer characteristic of the modulator. The Mach-Zehnder opto-electronic modulator, for example, has a sine wave transfer characteristic, arising from modulation in the modulator paths.

A number of linearisation approaches exist in the prior art for analogue electrical and optical solutions but these add complexity and often can offer only limited performance improvements. There are benefits therefore if the linearisation can be performed digitally, i.e. after the ADC.

The use of digital linearisation of optical links after the ADC has been applied in "Digitally Linearised Wide-Band Photonic Link" T. R. Clark and P. J. Matthews, Journal of Lightwave Technology, Vol 19, No 2, February 2001, p172, where the well behaved sinusoidal characteristic of a Mach-Zehnder modulator is inverted to provide a linearised signal. This technique relies on the modulator being biased at quadrature, but in practice accurate biasing is difficult to achieve and subject to drift. It is also limited to correcting for the sinusoidal transfer characteristic and cannot correct for non-linearities in other components. In addition it is also limited to application frequencies in the region of 0 Hz and to modulators with a flat frequency response.

A known method of measuring the linearity of a system is to inject a tone and then to sample the data and obtain the spectrum using a Fast Fourier Transform (FFT). The output spectrum contains a line at the frequency of the input tone, but also contains lower power output lines at multiples of the input frequency (harmonics).

There are examples in the prior art where the possibility of direct calculation of the non-linearity from the spectrum is considered (e.g. A/D Converters Nonlinearity Measurement and Correction by Frequency Analysis and Dither", F. Adamo, F. Attivissimo, N. Giaquinto, A. Trotta, IEE Transactions on Instrumentation and Measurement, Vol. 52, No 4, August 2003) but not achieved. These techniques tend to use orthogonal polynomials because of their potential for good representation of the non-linear system but add complexity and are restricted in their good performance to specific input signal types. They are also not designed to take advantage of the known sinusoidal transfer characteristic of the Mach-Zehnder modulator.

SUMMARY OF THE INVENTION

It is an objective of the invention to provide an improved method and means for linearising an opto-electronic or electronic apparatus.

In a first aspect, the invention provides a method of linearising a non-linear opto-electronic or electronic apparatus, the method comprising the steps:

(a) injecting one or more calibration tones as an input electrical signal and obtaining a digitised form of the output signal of said apparatus;

(b) obtaining the spectrum of said digitised form and measuring, in the frequency domain, spectral values at the frequencies of the input tone or tones and at the frequencies of spectral lines arising from the non-linearity;

(c) providing, from said spectral values, an inverse form of the non-linearity; and (d) performing linearisation on subsequent output signals for arbitrary input signals by applying said inverse form of the non-linearity to the output signal.

In a second aspect, the invention provides a non-linear opto-electronic or electronic apparatus, including means for linearising the apparatus that comprise:

(a) input means for receiving one or more calibration tones as an input electrical signal and means for obtaining a digitised form of the corresponding output signal of said apparatus;

(b) means for obtaining the spectrum of said digitised form and measuring, in the frequency domain, spectral values at the frequencies of the input tone or tones and at the frequencies of spectral lines arising from the non-linearity;

(c) means for providing, from said spectral values, an inverse form of the non-linearity; and (d) means for performing linearisation on subsequent output signals for arbitrary input signals by applying said inverse form of the non-linearity to the output signal.

In a more specific aspect, the invention provides an opto-electronic apparatus that includes an opto-electronic modulator for receiving an incoming electrical signal and for modulating a light signal passing through the modulator, wherein the transfer characteristic of the modulator is known, and including means for detecting the modulated light signal and for digitising the detected signal, the apparatus further comprising:

(a) means for injecting one or more calibration tones into the apparatus as an input electrical signal and means for obtaining a digitised form of the corresponding detected modulated light signal;

(b) means for obtaining the spectrum of said digitised form of signal from step (a) and for measuring, in the frequency domain, spectral values at the frequencies of the input tone or tones and at the frequencies of spectral lines arising from a non-linearity in the apparatus;

(c) means for providing, from said spectral values, an inverse form of the non-linearity; and (d) means for performing linearisation on subsequent output signals for arbitrary input signals by applying said inverse form of the non-linearity to the output signal.

In a preferred embodiment, the invention is concerned with an opto-electronic apparatus including a light transmitter, an opto-electronic modulator for receiving an input electrical signal for modulating the light from the transmitter, a light receiver, means for digitising the electrical output from the light receiver, and a processor for processing the digitised electrical signals. The linearisation method of the invention is based on applying a modulating signal comprising one or more calibration tones to the modulator and measuring the harmonics generated in the digitised electrical signals. An expression is derived that quantifies the non-linearity in terms of the amplitudes of the harmonic signals. The processor is employed to calculate the non-linearity, and then to invert the non-linearity and to apply the inversion to subsequent incoming data in order to linearise the data.

The invention is in principle applicable to any type of non-linearity within the opto-electronic apparatus, be it the laser, photo detector, amplifiers, or modulator. The present invention is however particularly applicable to opto-electronic modulators that are the principal cause of non-linearity. The present invention is particularly applicable to opto-electronic modulators of the Mach-Zehnder type, since these have a well determined sine wave characteristic, and a precise expression can be derived representing the sine wave non-linearity in terms of harmonics, which when applied gives a very good correction. The present invention may in principle be applied to other types of modulators.

The invention also envisages application of a power series linearisation for other non-linearities existing within the system such as those for a laser light source, amplifiers and a photodetector.

The invention is also applicable to electronic apparatus that includes non-linearities.

The invention in at least a preferred embodiment consists of two distinct phases, calibration then linearisation. In one form the calibration steps are as follows:
1) Run the system for a tone input and collect a batch of data.
2) Calculate the spectrum of the data (e.g. using an FFT).
3) Measure the output at the input frequency (complex value) and at the frequency of the harmonics (complex values).
4) Derive the non-linearity from the spectral measurements based on a sine characteristic.
5) Invert the non-linearity.

The linearisation stage applies the inverted non-linearity to the time-domain input data as it arrives.

The spectrum may be measured by an FFT, or a bank of filters, or any other spectral estimation method.

In a preferred form of the invention, by using the known sine characteristic, non-linearities due to the Mach-Zehnder modulator, which is typically the dominant source of non-linearity, are largely corrected. To correct for the other sources of non-linearity a further linearisation stage can be performed, utilising the same collected data, based on a more general non-linear expression such as the power series. Other sources of non-linearities include, for example, electrical amplifiers (which may be incorporated in any of the electrical stages of the system) and the photo-diode.

The steps for this second linearisation stage are as follows:
1) Apply the linearisation derived in stage 1 to the same batch of data.
2) Calculate the spectrum of the data.
3) Measure the harmonics.
4) Derive the non-linearity from the harmonics measurements based on the power series.
5) Invert the non-linearity.

The two inverse non-linearities can then be applied separately to the data or combined into a single non-linearity for linearisation.

Once the direct calculation of the parameters of the non-linearity has been performed the linearisation performance can be further improved, if the parameters are varied from their calculated values, i.e. determining a more refined set for their values by comparing the performance in the frequency domain. The choice of values may be chosen over a range or successively chosen on each iteration based on the results of the previous iteration to converge on an improved solution. Rather than iterate based on the results of the direct calculations, the inverse non-linearity could alternatively be determined entirely by iteration from arbitrary initial values.

In an alternative form of the invention, the computation procedure may be modified, in that a look up table is generated from the expression for the non-linearity, and the inverse is obtained directly from the look up table i.e. by looking up the curve represented by the look up table from the other axis to that for looking up the forward non-linearity.

The invention may employ a single calibration tone, for simplicity. A potential difficulty with a single calibration tone is that the harmonics to be measured may exceed the frequency bandwidth of the analogue to digital converter in certain situations. The present invention proposes in a further aspect application of two or more simultaneous calibration tones. The non-linearities to be corrected create inter modulation products of these two modulation tones that are relatively close together in terms of frequency. The amplitudes of the inter modulation products are measured. A suitable expression is derived defining the non-linearity in terms of these inter modulation products, and a correction may then be applied, in accordance with the invention.

Significant variation in the frequency response in the system arising in the component(s) causing the non-linearity can disrupt the performance of the linearisation. The invention can be combined with any method for correcting for variation in the frequency response, for example stepping an input tone across frequency to determine the frequency response and then deriving a filter from the measurements. The frequency correction can be performed at low signal strength to minimise any inter-dependence on the linearity. The linearisation can then be applied after frequency response correction. In this case there is just one non-linearity over the entire spectrum.

In a further procedure, the present invention recognises that certain non-linearities may have different characteristics in different frequency regions of the bandwidth of interest and hence that more than one non-linearity may better represent the system. In this case, the bandwidth may be split into plurality of notional frequency channels and a separate correction may be applied for each channel by repeating the calibration procedure for each channel. For N frequency bands the calibration procedure is performed N times using calibration signals at frequencies in each of the N bands respectively. The linearisation procedure is similarly applied N times to produce N output sets of data. The spectrum is calculated for each of the N linearised sets of data and the corresponding frequency band to each set used. This is illustrated in FIG. 5.

The invention is an improvement on analogue electrical or optical approaches that exist in the prior art because these add hardware complexity into the signal path and typically offer only limited performance improvements including limited bandwidth performance or increased noise.

The invention has advantages over the digital methods in the prior art (Clark et al) as it can additionally:
(1) Automatically account for the modulator bias point.
(2) Be calibrated using a single input tone that is beneficial in systems already utilising tones e.g. for calibrating the frequency response.
(3) Improve the linearisation performance, using the same linearisation data, by a following correction using a power series representation for the remaining non-linearities.

(4) Calibrating with a tone, or tones, allows a more accurate determination of the non-linear parameters to a specific frequency range instead of being only valid in a region near to 0 Hz.
(5) Be used to perform frequency dependent linearisation.

It is evident that there may be variations on the algorithm without departing from the scope of the invention. For instance, during calibration the inverse non-linearity could alternatively be derived directly without the intermediate step of determining the forward non-linearity.

The signal and the harmonics may have frequencies higher than the Nyquist frequency (half the sampling rate of the system) and be folded back into the band.

To allow for drift of the system the calibration procedure can be repeated at regular intervals.

Where non-linearities are cascaded in the hardware architecture, the algorithm may also be cascaded. This may be performed by consecutive derivation of the successive non-linearities or in a single step by deriving for a single combined non-linearity.

BRIEF DESCRIPTION OF THE DRAWINGS

A preferred embodiment of the invention will now be described with reference to the accompany drawings wherein.

DESCRIPTION OF PREFERRED EMBODIMENTS

Figure 2:
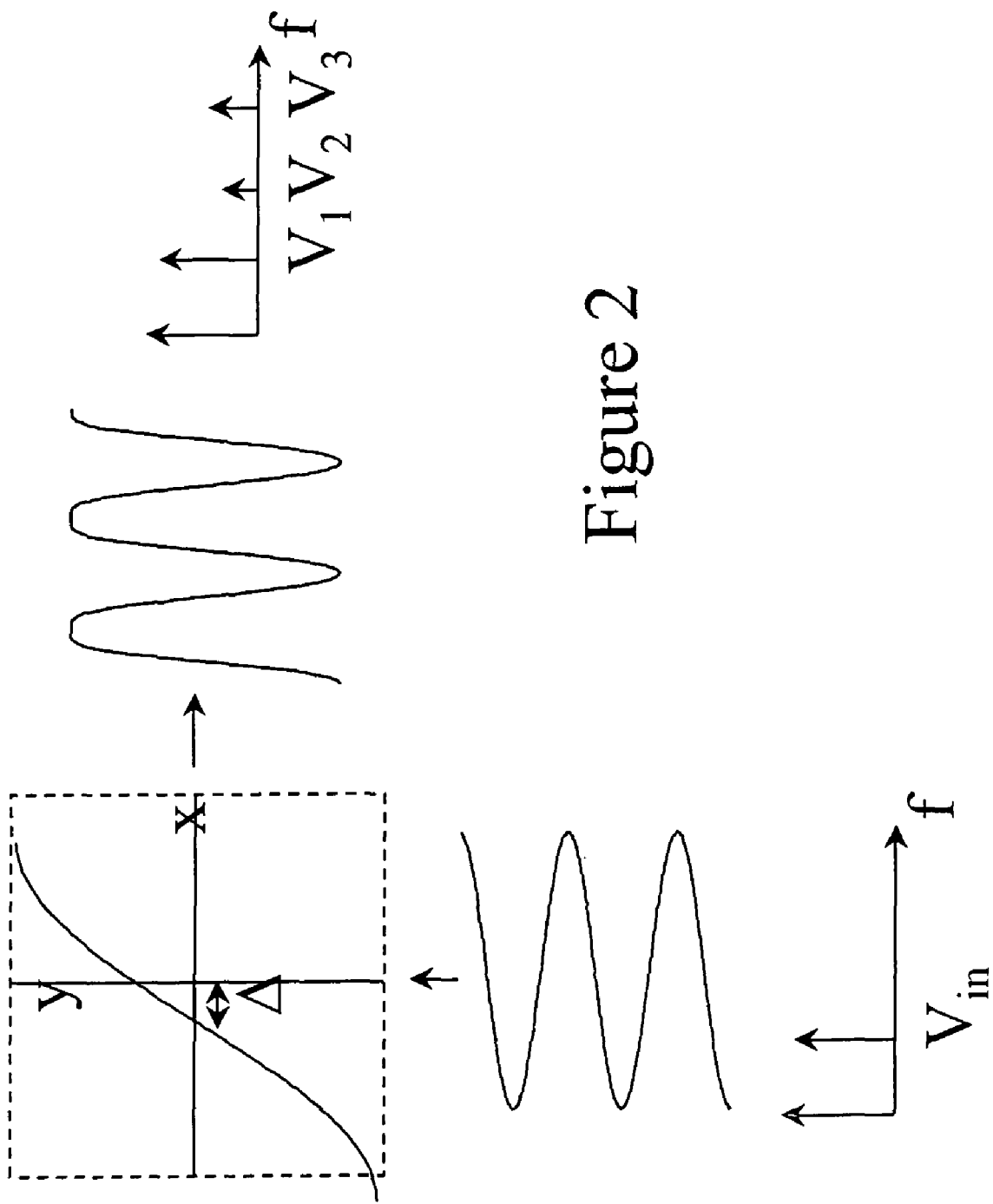
FIG. 2 is a schematic of a Mach-Zehnder transfer characteristic for understanding the invention.

For a Mach-Zehnder modulator, the transfer characteristic is as shown in FIG. 2, shown to 3rd order, where the input signal to a non-linear system has harmonics present on the output.

The following describes the algorithm for calculating the non-linearity based on the sinusoid transfer function.

The transfer characteristic is:

$$y = \beta \sin(\alpha x + \Delta)$$

Where y represents the output voltage, x represents the input voltage, and $\alpha$ and $\beta$ are scaling factors, and $\Delta$ is the bias offset of the Mach-Zehnder modulator.

Assume a single tone input signal:

$$x = b \cos(2\pi f t + \phi) = b \cos \theta$$

Where b and $\phi$ and f are the amplitude, phase and frequency of the input signal respectively, and t is time.

It can be shown that, to 3rd order, the resulting spectrum consists of 4 complex values: $V_0$ at 0 Hz, $V_1$ at the input frequency, $V_2$ at the second harmonic, and $V_3$ at the third harmonic.

To derive the parameters for the non-linearity the sin characteristic can be represented approximately by its power series e.g. to two terms:

$$y = \beta \sin(\alpha x + \Delta) \approx (\alpha x + \Delta) - \frac{(\alpha x + \Delta)^3}{3!}$$

Substituting the equation for the input signal into the above equation and expanding gives expressions for the coefficients of the harmonic frequencies which correspond to $V_0, V_1, V_2$ and $V_3$. Expressions can then be obtained for the scaling and phase offset of the non-linearity i.e.

$$\beta = -\frac{24 V_3}{(\alpha \beta)^3 e^{3(\alpha x + \Delta)}}$$

$$\Delta = \frac{\alpha \beta V_2 e^{\alpha x + \Delta}}{6 V_3}$$

Where the overall scaling of the input to the non-linearity is:

$$(\alpha b)^2 = \frac{72 V_3^2 |V_1|^2}{V_2^2 V_1^2 + 9 V_3^2 |V_1|^2 - 3 V_3 V_1^3}$$

The linearised signal can then be reconstructed using the inverse sine:

$$x = \frac{1}{\alpha}\left(\sin^{-1}\left(\frac{y}{\beta}\right) - \Delta\right)$$

Where there may be further sources of non linearities in the system a further algorithm based on a power series is employed on the calibration data for computing further non linearities.

The following describes the algorithm for calculating the non-linearity based on the power series:

The general form of the power series for an asymmetric transfer function is:

$$y = a_0 + a_1 x + a_2 x^2 + a_3 x^3 + \ldots (a_4 x^4 + a_5 x^5 \ldots)$$

A general scaling factor ($\beta$) can be separated out, and approximating by terms up to 3rd order and also put k1=1 so that beta is the overall scaling.

$$y = k_0 \beta + k_1 \beta x + k_2 \beta x^2 + k_3 \beta x^3$$

As before, to 3rd order, the resulting spectrum consists of 4 complex values from which the parameters can be derived. i.e. as before, substituting the expression for the signal into the equation for y, and expanding gives the expressions that multiply the harmonics which correspond to $V_0, V_1, V_2$ and $V_3$ which can be measured. For example, in a 3rd order system $k_2$ and $k_3$ can be shown to be:

$$k_2 = \frac{2 V_2 \beta V_1^6}{(V_1^3 - 3 V_3 |V_1|^2)^2}$$

$$k_3 = \frac{4 \beta^2 V_3 V_1^6}{(V_1^3 - 3 V_3 |V_1|^2)^3}$$

The value of β is not known but to linearise the data its value is not needed, as can be seen by substituting $k_2$ and $k_3$, and $k_1=1$ back into the expression for y i.e.:

$$y = k_0\beta + \beta x + \frac{2V_2 V_1^6}{(V_1^3 - 3V_3|V_1|^2)^2}(\beta x)^2 + \frac{4V_3 V_1^6}{(V_1^3 - 3V_3|V_1|^2)^3}(\beta x)^3$$

The above equation is a power series in βx. Therefore calculating the inverse returns the linearised result except for an offset—which it is not necessary to calculate.

The inverse of a power series can be derived analytically. For example, for the following 3rd order non-linearity:

$$y=a_1 x+a_3 x^3+\ldots(a_5 x^5+a_7 x^7 \ldots)$$

With the inverse:

$$x=b_1 y+b_3 y^3+\ldots(b_5 y^5+b_7 y^7 \ldots)$$

It can be shown that:

$$b_1 = \frac{1}{a_1}, \quad b_3 = -\frac{a_3}{a_1^4}$$

However, a more convenient and accurate way of inverting the non-linearity is to generate a look-up table of the forward curve and to obtain the inverse by the inverse look up from the table.

It is evident that there may be variations on the above calculations without departing from the scope of the invention.

For instance, the expressions are given to 3rd order but could have been expressed to higher numbers of terms.

Figure 1:
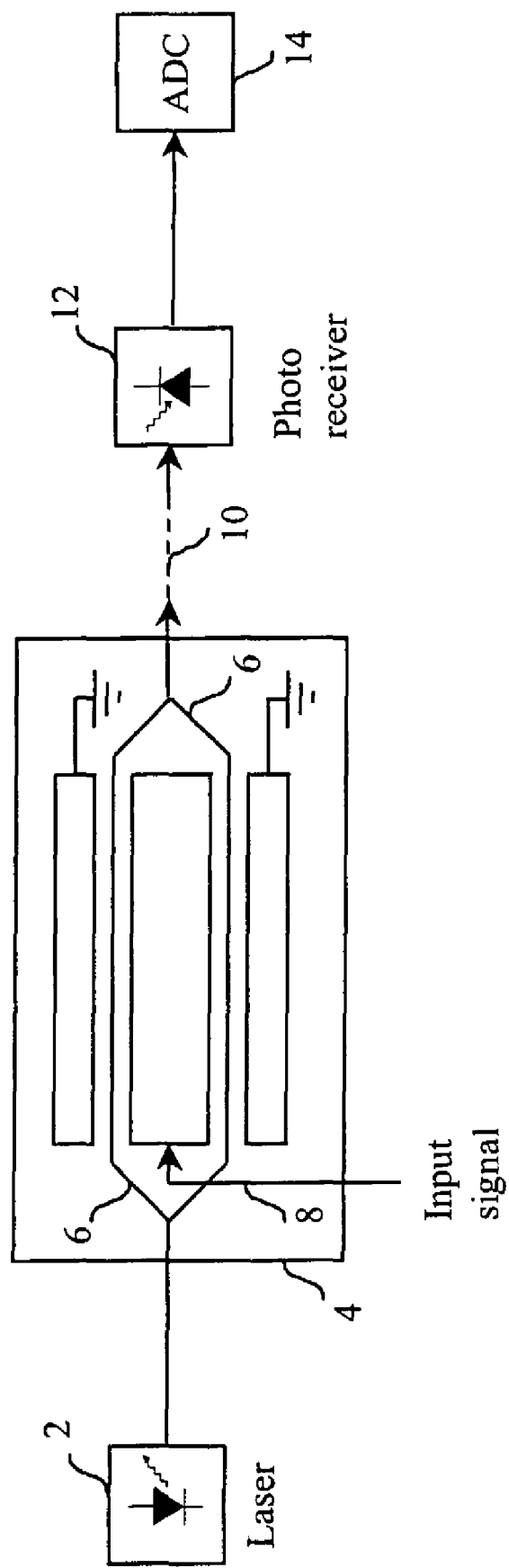
FIG. 1 is a schematic view of a known opto-electronic link.
Figure 3:
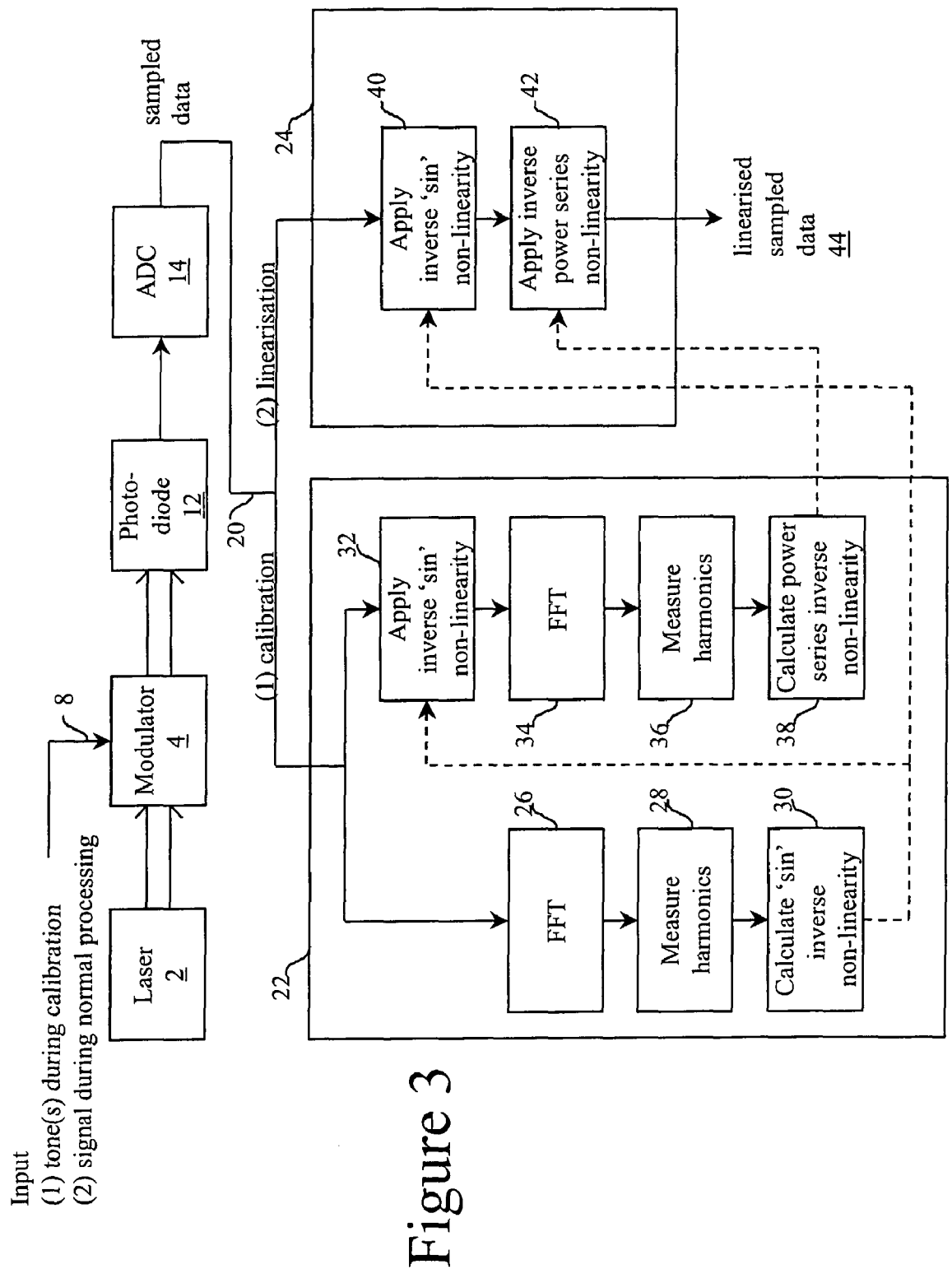
FIG. 3 is a schematic diagram of an opto-electronic link incorporating the calibration and linearisation measures of the invention.

Referring now to FIG. 3, that is a schematic diagram of an opto-electronic link incorporating the calibration and linearisation measures of the invention, similar parts to those shown in FIG. 1 are indicated by the same reference numerals.

The digitised form of data obtained from ADC 14 is applied on line 20 to a signal processor that includes a calibration section 22 and a linearisation section 24. The blocks within sections 22 and 24 represent processing steps on incoming data.

In a calibration phase, a single calibration tone is input to input 8 of modulator 4. The digitised form of the data obtained from ADC 14 is applied to calibration section 22, where an FFT as at 26 performs a Fourier Transform on the data, and provides complex output signals in frequency bins. These outputs are measured as at 28 to determine the amplitude of the calibration tone and the harmonics resulting from the non-linearities in the modulator.

Using the expressions given above, the inverse non-linearity is computed as at 30 for a sinusoidal transfer function of modulator 4.

In the embodiment of FIG. 3, a further power series linearisation function is provided for further non-linearities existing in the optical link 2-12, and in this second phase of calibration, the same set of sampled data on line 20 is applied to unit 32. The inverse non-linearity for a sinusoid function, calculated as at 30, is applied to the data as at 32. This is effective to linearise the data for the sinusoid function. The linearised data is then subject to an FFT as at 34, and the harmonics are measured as at 36, as described above with reference to blocks 26, 28. In unit 38, the power series inverse non-linearity is computed from the measured values of the harmonics, employing the expressions given above. This ends the calibration phase.

In the linearisation phase, a signal to be processed is provided at input 8 of modulator 4. The digitised form of the signal on line 20 is applied to linearisation section 24. In block 40, the sinusoid inverse non-linearity computed as at 30 is applied to the signal on line 20 to perform the first phase of linearisation. In block 42, the inverse non-linearity for the power series computed as at 38 is applied in a second phase of linearisation. The fully linearised data is output on output line 44.

Figure 4:
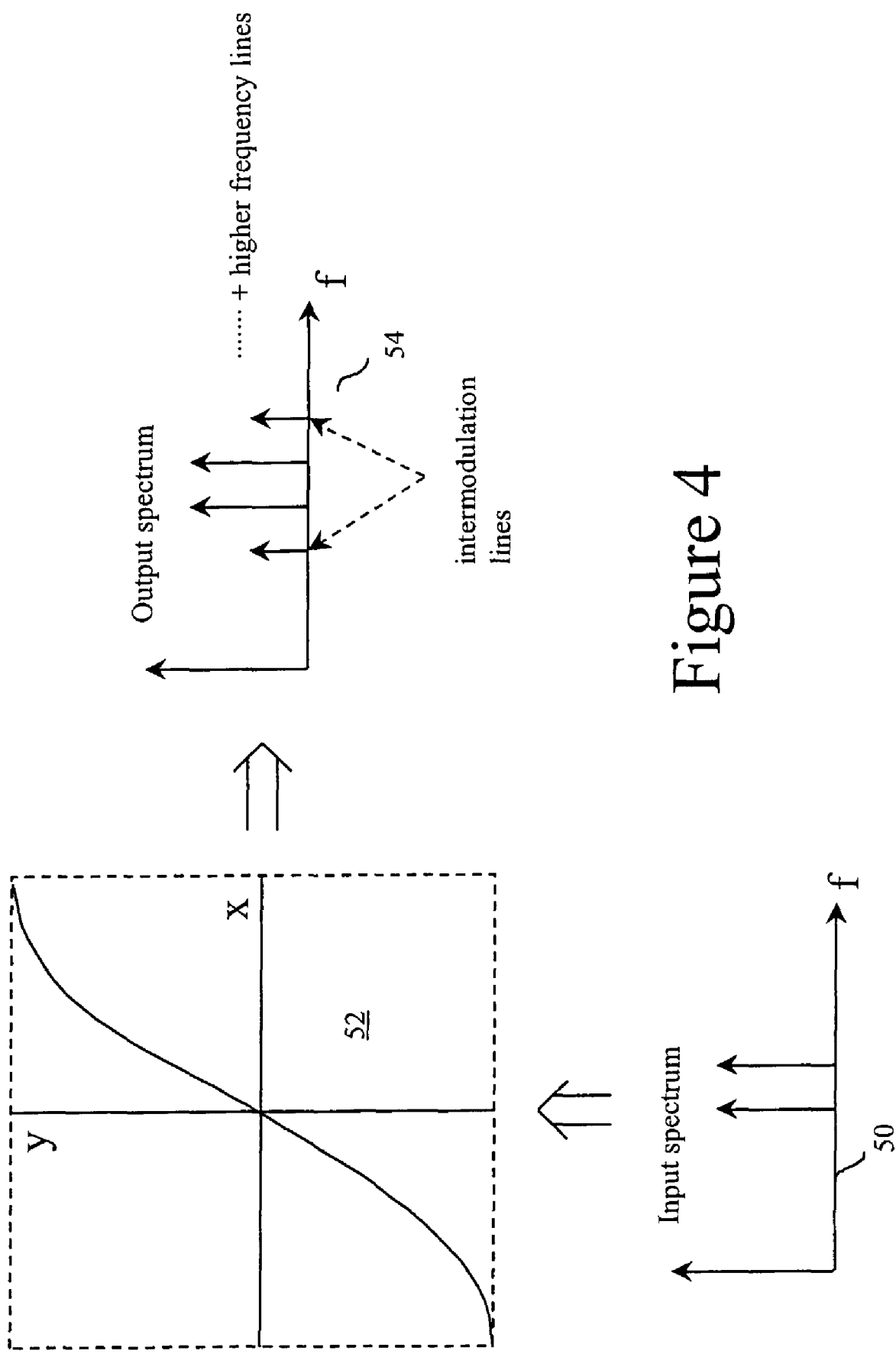
FIG. 4 is a schematic diagram showing the use of two calibration tones and their intermodulation products in the present invention.

As noted above, a potential difficulty with employing a single calibration tone that generates harmonics is that in certain circumstances, the frequency range of the spectral lines may exceed the dynamic range of the ADC. In a modification of the invention, as schematically illustrated in FIG. 4, two calibration tones are applied to the modulator. This is illustrated where the calibration tones 50 are applied to the sinusoid function 52 of the modulator. The output spectrum 54 includes intermodulation products of the two calibration tones. The intermodulation lines are comparatively close to the basic calibration tones in frequency. There are of course higher frequency spectral lines resulting from harmonics and further intermodulation products, but these may be ignored for the purposes of analysis. The values of the spectral lines 54 obtained by applying an FFT to the digitised form of the signals from the ADC are employed to compute inverse non-linearities for the linearisation process. The equivalent equations to the equations given above for a single tone input can be derived for inputs of two or more tones by the same steps described above by someone skilled in the art.

The processes of calibration indicated above may be improved by an iterative method based on varying the various factors so as to achieve convergence.

Also, the expressions given are for when using a single tone calibration signal but equivalent calculations can be performed for using two tones (or greater than two tones).

Figure 5:
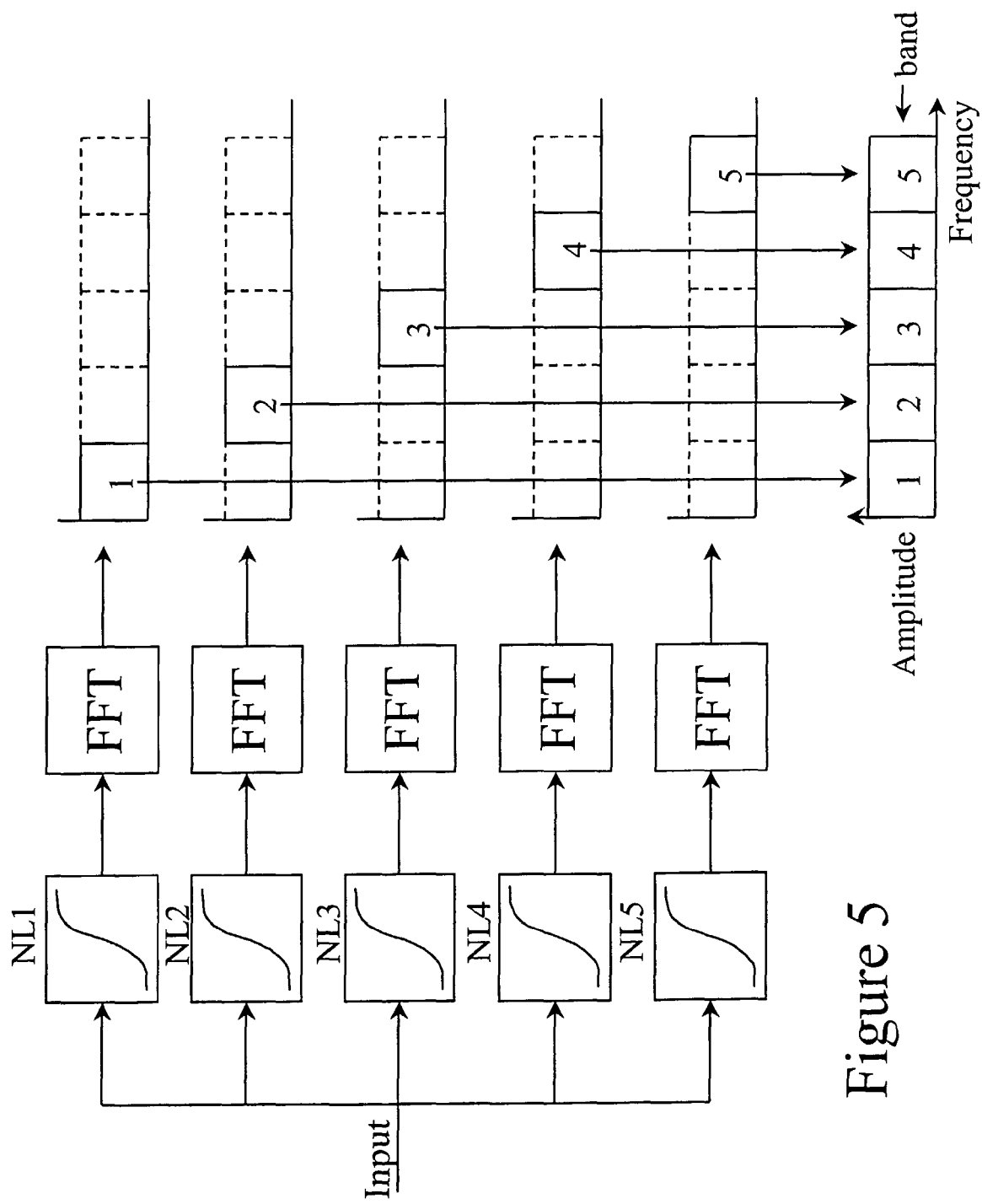
FIG. 5 is a schematic view of a means of linearising a system wherein the non-linearity is frequency dependent

It is further possible to make corrections to frequency response variations in the non-linearity as shown in FIG. 5 for the number of channels, N, equal to 5, which illustrates that different frequencies pass through different non-linearities.

During calibration, different inverse non-linearities (the inverses of NL1-NL5) can be derived for different bands of the frequency spectrum, e.g. by implementing the calibration procedure using single tone or two tone tests in each frequency band, and then the spectrum is re-constructed from the separate bands during linearisation.

The invention claimed is:

1. A method of linearising a non-linear opto-electronic or electronic apparatus, the method comprising the steps:
   (a) injecting one or more calibration tones as an input electrical signal and obtaining a digitised form of the output signal of said apparatus;
   (b) obtaining the spectrum of said digitised form and measuring, in the frequency domain, spectral values at the frequencies of the input tone or tones and at the frequencies of spectral lines arising from the non-linearity;
   (c) providing, from said spectral values, an inverse form of the non-linearity; and
   (d) performing linearisation on subsequent output signals for arbitrary input signals by applying said inverse form of the non-linearity to the output signal.

2. A method according to claim 1, wherein step (c) comprises directly calculating, from mathematical expressions in terms of said spectral values, parameters for said inverse form.

3. A method according to claim 1, wherein step (b) and step (c) are repeated iteratively from arbitrary initial values in order to derive parameters for said inverse form.

4. A method according to claim 2, wherein step (b) and step (c) are repeated iteratively from initial values comprising the directly calculated parameters for said inverse form.

5. A method according to claim 2, wherein said inverse form comprises a look-up table or mathematical expression generated from said parameters.

6. A method according to claim 2, wherein said parameters are parameters of a sinusoidal function.

7. A method according to claim 2, wherein said parameters are parameters of a power series function.

8. A method according to claim 6, wherein, subsequent to step (c) the following steps are performed:
  i. obtaining sampled data from said digitised form of the output signal at step (a) and performing linearisation of those sampled data by applying said inverse form of the sinusoidal non-linearity;
  ii. obtaining the spectrum of said linearised sampled data and measuring, in the frequency domain, spectral values at the frequencies of the input tone or tones and at the frequencies of spectral lines arising from a further non-linearity; and
  iii. providing, from the spectral values at step ii, parameters for an inverse form of the further non-linearity wherein said parameters are parameters of a power series function.

9. A method according to claim 1, wherein the non-linearity of the apparatus is represented by two or more separate non-linearities and wherein an inverse form for each separate non-linearity is determined by means of said steps (b) and (c) in a sequential approach whereby the inverse form applicable to a given non-linearity is determined after performing linearisation in respect of any preceding non-linearities in the sequence.

10. A method according to claim 1, wherein the linearisation is combined with a process for calibrating the frequency response of the apparatus and wherein a single non-linearity applies across a given frequency range.

11. A method according to claim 1, wherein the non-linearity is frequency dependent, the method further comprising the steps:
  (A) dividing an output signal of the apparatus into a plurality of channels, each channel corresponding to a different frequency band;
  (B) injecting calibration signals in respect of each frequency band and applying steps (b) and (c) to derive an inverse non-linearity for that band,
  and, during linearisation, applying the different inverse non-linearities to each respective channel.

12. A method according to claim 1, wherein said spectral values comprise harmonics of a single calibration tone.

13. A method according to claim 1, wherein said spectral values comprise intermodulation products of at least two calibration tones.

14. A method according to claim 1, wherein calibration steps (a) to (c) are performed at intervals in time to update said inverse forms of non-linearity.

15. A method according to claim 1, applied to an opto-electronic apparatus that includes an opto-electronic modulator.

16. A method according to claim 5, wherein said opto-electronic modulator is a Mach-Zehnder modulator or any other device with the property of having a sinusoidal non-linearity.

17. A non-linear opto-electronic or electronic apparatus, including means for linearising the apparatus that comprise:
  (a) input means for receiving one or more calibration tones as an input electrical signal and means for obtaining a digitised form of the corresponding output signal of said apparatus;
  (b) means for obtaining the spectrum of said digitised form and measuring, in the frequency domain, spectral values at the frequencies of the input tone or tones and at the frequencies of spectral lines arising from the non-linearity;
  (c) means for providing, from said spectral values, an inverse form of the non-linearity; and
  (d) means for performing linearisation on subsequent output signals for arbitrary input signals by applying said inverse form of the non-linearity to the output signal.

18. An opto-electronic apparatus that includes an opto-electronic modulator for receiving an incoming electrical signal and for modulating a light signal passing through the modulator, wherein the transfer characteristic of the modulator is known, and including means for detecting the modulated light signal and for digitising the detected signal, the apparatus further comprising:
  (a) means for injecting one or more calibration tones into the apparatus as an input electrical signal and means for obtaining a digitised form of the corresponding detected modulated light signal;
  (b) means for obtaining the spectrum of said digitised form of signal from step (a) and for measuring, in the frequency domain, spectral values at the frequencies of the input tone or tones and at the frequencies of spectral lines arising from a non-linearity in the apparatus;
  (c) means for providing, from said spectral values, an inverse form of the non-linearity; and
  (d) means for performing linearisation on subsequent output signals for arbitrary input signals by applying said inverse form of the non-linearity to the output signal.

19. Apparatus according to claim 18, wherein said modulator is a Mach-Zehnder modulator.

* * * * *